2,814,618
SPHERICAL NON-POROUS WATER-INSOLUBLE CELLULOSE ETHERS

Arthur W. Sloan, Washington, D. C., assignor to Atlantic Research Corporation, Alexandria, Va., a corporation of Virginia No Drawing. Application January 3, 1955, Serial No. 479,639

14 Claims. (Cl. 260—232)

This invention relates to new and improved water-insoluble cellulose ethers in the form of small, dense, substantially spherical particles.

Cellulose ethers, such as ethyl cellulose, have hitherto been produced in the form of particles which are porous and/or relatively large and irregularly shaped. These characteristics make it impossible to suspend the particles in a plasticizer to form a fluid, pourable, homogeneous suspension. The large particles sediment rapidly and the porous particles are quickly infiltrated by the plasticizer to form wet powders. Flat or irregularly shaped particles, regardless of density, cannot be introduced into a plasticizer in any substantial quantities without loss of fluidity.

For these reasons, it has hitherto been the practice to mix the cellulose ether with plasticizer in a kneader or masticating mill to form a stiff paste and then to extrude it under heat and pressure into the desired shape or to introduce the paste into a mold and subject the material to heat and pressure. To prepare more fluid mixes, as, for example, for making coatings or films, it has been necessary to introduce considerable amounts of a volatile solvent or to form aqueous emulsions of the material. Since the volatile solvent and water must be removed, such a procedure is feasible for use only in the manufacture of thin films. Removal of the solvent also causes shrinkage of the film which in many cases is undesirable.

The object of this invention is to provide small, substantially spherical, dense particles of cellulose ethers.

Other objects and advantages will become obvious from the following detailed description.

Processes for making the small, substantially non-porous, substantially spherical particles are described in Sloan patent application Serial No. 479,640, filed January 3, 1955.

Broadly, the process, as described in said Sloan application, comprises dissolving the cellulose ether in a suitable organic solvent, dispersing the resulting lacquer with vigorous agitation in water containing a suitable protective colloid and a suitable, water-soluble salt or water soluble polyhydroxy compound to form an oil-in-water type emulsion and then removing the organic solvent from the dispersed cellulose ether particles. It is desirable, though not essential, to employ a polar-type, surface-active emulsifying agent in addition to the colloiding agent in some cases.

Any suitable, water-insoluble cellulose ether such as an alkyl ether or hydroxyalkyl ether as, for example, ethyl cellulose or hydroxyethyl cellulose, butyl cellulose or the like, may be treated according to my process.

To obtain particles of the desired size, sphericity and density, the components and conditions of the process must be carefully controlled.

The cellulose ether solvent may be a single solvent which is insoluble to moderately soluble in water or a mixture of solvents, at least one component of which is insoluble to moderately soluble in water and another component of which may be infinitely soluble in water. Whether a single or mixed solvent is employed for the cellulose ether, maximum solubility of the organic solvent in water must be about 50 to 60 parts, preferably about 40 parts, in 100 parts of water at 20° C. The amount of infinitely soluble component in a mixed solvent must not exceed such proportions as to raise total solubility of the mixed solvent above the 60% maximum. By "moderately soluble" is meant an organic solvent having a solubility of about 5 to 30 parts per 100 parts of water at 20° C. In general, for optimum performance, it is preferable that the cellulose ether solvent, whether single or mixed, have a minimum solubility of about 5 parts per 100 parts of water.

Insoluble to moderately soluble solvents which may be employed include, for example, benzene, toluene, methyl acetate, ethyl acetate, methyl formate, ethyl formate, diethyl ether, methyl ethyl ketone, methylene chloride, ethylene dichloride, chloroform and the like.

Infinitely water-soluble co-solvents include the lower aliphatic alcohols such as methyl, ethyl and propyl alcohols, acetone, methyl lactate, ethyl lactate and dioxant-1,4.

Where co-solvent mixtures are used, it is not essential that each of the co-solvent components be a good solvent for the cellulose ether so long as they possess good solvent properties when in admixture. The lower aliphatic alcohols, for example, though poor solvents for ethyl cellulose, per se, possess excellent co-solvent properties. It is desirable that the infinitely soluble component of a mixed cellulose ether solvent possess the ability to reduce viscosity of the lacquer. Methanol, ethanol and acetone are particularly effective in this regard.

Where a mixed cellulose ether solvent as, for example, one containing an infinitely soluble component, is employed, the ratio of components for optimum performance can readily be determined by routine experimentation. In most cases a ratio of water-insoluble or moderately soluble component to infinitely soluble component of 80:20 to 85:15 by volume is particularly good. However, this may be varied so long as total solubility of the mixed solvent does not become excessive.

Choice of solvent is influenced to some extent by the particular colloiding agent employed. The protective colloid must not be excessively soluble in the cellulose ether solvent since, otherwise, the system would tend to form a water-in-oil type emulsion. This situation can be handled by employing a colloid which is not highly soluble in the specific solvent or by avoiding the use of solvents which tend to dissolve the particular colloid out of the water phase.

If the organic solvent is to be removed by distillation, it is desirable that the solvent have a relatively low boiling point. If elution is employed the solvent should be moderately soluble in water and, if a mixed solvent is used, the least soluble component should be moderately water-soluble.

I have found that to obtain spheres of the desired small size, concentration of the cellulose ether in the lacquer should not exceed about 20% by weight. Optimum concentration is about 7.5 to 15%. Lacquers containing more than about 20% cellulose ether are highly viscous and are comminuted with difficulty to produce particles of generally excessive size. There is no critical lower limit of cellulose ether concentration in the lacquer other than that dictated by economic expediency. Good results are obtainable, for example, with concentrations as low as 2%. This, however, requires the use of large amounts of solvent and large operating equipment relative to the amount of cellulose ether processed.

The cellulose ether lacquer is mixed with water in the presence of a suitable colloiding agent and a water-soluble salt or polyhydroxy compound with vigorous agitation to form a dispersion of small spherical lacquer particles with the water as the continuous phase. The colloid and salt are preferably introduced into the water prior to mixing. The dispersion and agitation may be accomplished by any suitable means as, for example, in a homogenizer or other suitable agitating device. The degree of agitation is one of the factors influencing particle size. In general, the more vigorous the agitation, the smaller are the particles.

The amount of water employed in dispersing the cellulose ether lacquer is an important factor in determining particle size. Particle size is a function of the lacquer/water ratio in as much as increasing the amount of water increases particle size. Thus the quantity of water used in emulsification is determined in some measure by the particle size desired. The minimum amount of water is governed by the lacquer/water ratio required to permit formation of the requisite oil-in-water type emulsion. If excessive water is employed, the particles tend to become oversize and may also become irregular and porous, particularly if the organic solvent is moderately soluble in water. In general, the maximum amount of water which gives satisfactory results in terms of desired particle characteristics is about 150% by volume based on the volume of organic solvent and preferably about 50 to 100%.

The colloiding agent is desirably a high molecular weight polymer or co-polymer which is preferentially soluble in water rather than in the organic solvent and which increases the viscosity of the water phase to a considerable extent. A colloiding material which is excessively lipophilic should be avoided since the emulsion would tend to form a water-in-oil system. A colloid which is normally hydrophilic may show an excessive affinity for a particular organic solvent and, as aforementioned, a different solvent or another colloiding agent must be employed. Examples of colloiding agents which I have found suitable include methyl cellulose, casein, the condensation product of polyvinyl methyl ether and maleic anhydride, gelatin, agar-agar, polysodium acrylate, polyvinyl alcohol and alginates. Of these, methyl cellulose, polyvinyl methyl ether-maleic anhydride and casein are particularly satisfactory. The methyl cellulose is preferably of the higher molecular weight variety, namely one having a minimum centipoise value of about 400 and preferably about 150 to 4000 or higher. Efficacy of any given colloiding agent varies to some degree according to the particular organic solvent used.

The colloiding agent forms a colloidal solution with the water, thus increasing the viscosity of the water phase, and also surrounds the lacquer particles with a protective coating. These factors stabilize the emulsion by reducing tendency of the particles to coalesce, particularly during stripping of the solvent. This is important since the particles must be maintained in a state of dispersion until surface tackiness has been substantially eliminated and hardening has progressed to the point where the particles will no longer agglomerate.

The amount of colloiding agent employed is determined by several factors. Primarily, it should be sufficient to produce substantial increase in the viscosity of the water phase and to coat the particles, thus providing adequate stabilization of the emulsion during processing. Generally speaking, the higher the molecular weight of the colloid, the less will be required. The colloid is also a factor in controlling particle size since increasing concentration tends to reduce particle size. There is no critical upper limit to the amount of colloid employed other than practical considerations such as desired particle size and ease of washing. The more colloid present, the more washing is required for its removal.

It is essential that a suitable water-soluble salt or an organic polyhydroxy compound be included in the water phase of the emulsion system. It is apparently necessary for the proper functioning of the protective colloid. Without the addition of such compounds, the particles formed are non-spherical and oversize. The salt or polyhydroxy compound prevents the inversion of phase which frequently occurs when the emulsion is heated to distillation temperature to remove the organic solvent. It may be, also, that these additives exert a stabilizing effect by causing hydration of the colloid and thus preventing undue penetration of the colloid into the lacquer particle, and, in the case of the salts, by inducing a charge on the surface of the colloid-enveloped particle which tends to prevent agglomeration.

Any suitable, water-soluble salt which is compatible with the colloiding agent, namely one which will not cause it to precipitate, may be employed as, for example, the metal or ammonium halides, sulfates, acetates and the like. Choice of the particular salt employed is, in some measure, determined by the particular colloid used in the emulsion system. All of the colloiding agents except methyl cellulose function well with salts of any valence, preferably monovalent or divalent salts, as, for example, sodium chloride or sodium sulfate. Methyl cellulose, however, tolerates only monovalent salts such as the alkali metal and ammonium halides. By monovalent salt is meant one in which both the cation and anion are monovalent. By divalent salt is meant one in which at least one ion is divalent. In general, inorganic salts having monovalent cations are preferred, the alkali metal salts being most desirable.

The salt must be employed in an amount less than that which will cause precipitation of the colloid or a "salting out" effect. In general, the lower the molecular weight of the colloid, the greater the amount of salt which it will tolerate. Degree of salt toleration also varies with the particular salt.

I have found that below certain minimum salt concentrations the salt is not effective since the resulting particles tend to be oversize and non-spherical. This minimum amount varies with the particular salt. In general, the minimum concentration for the monovalent salts is about 6.5% based on the weight of the cellulose ether and for divalent salts, such as sodium sulfate, about 13%.

Additives other than salts which I have found to perform satisfactorily are water-soluble polyhydroxy compounds such as sugars, glycerin and glycols such as ethylene glycol, hexylene glycol and the like. In general, a minimum of about 6.5% on the cellulose ether is desirable for satisfactory performance.

In some cases, it may be desirable, though not essential, to include in the system a polar-type, surface-active emulsifying agent which produces a marked lowering of interfacial tension and which, unlike the higher molecular weight colloiding agent, does not produce any appreciable increase in the viscosity of the water phase. The surface-active emulsifying agent is advantageous in as much as in some instances it makes possible a reduction in the amount of colloid required for optimum performance and thus facilitates subsequent removal of the colloid from the particles. It also reduces the amount of energy and time required to disperse the lacquer in the water and to comminute it to the desired particle size.

Any suitable surface-active emulsifying agent may be employed which is compatible with the other components of the system and which is substantially soluble in water, namely possesses a sufficiently high hydrophile-lipophile balance to prevent its being drawn into the organic solvent and converting the emulsion into a water-in-oil system, may be employed, such as alkyl sulfates or sulfonates, alkylaryl sulfonates, alkali metal soaps, alkali metal and ammonium salts of perfluoro acids, alkali metal salts of sulfosuccinic acids, sulfonated oils including sulfonated vegetable oils and sulfonated hydrocarbon oils, polyglycols and the like. The moderately active types of emulsifying agents such as the sulfonated vegetable oils as, for example, sulfonated castor oil, sulfonated coconut oil and the like, sulfonated hydrocarbon oils as, for example, sulfonated petroleum fractions, alkali metal fatty acid soaps, polyglycols such as polyethylene glycol and polypropylene glycol, and the like, are especially satisfactory. The polyglycols, in addition to their dispersing action, also may be advantageous as coupling agents, namely as agents which increase solubility of the colloid or the organic solvent in water.

The amount of surface-active emulsifier is not critical but should be sufficient to promote the desired rapid emulsification and comminution of the particles. As little as about 0.01 to 0.025% based on the water phase may be adequate. The amount may be increased to as much as 5 to 10% in some cases. Concentrations of emulsifier in the range of about 0.01 to 2% are generally satisfactory. The emulsifier may be added to the water or to the lacquer phase.

After emulsification is completed, the organic solvent is removed from the dispersed particles by distillation or by elution. In either case, the emulsion should be maintained in a state of continuous vigorous agitation.

Distillation is accomplished by heating the emulsion to or near the boiling point of the organic solvent. If the distillation is conducted at atmospheric pressure, it is desirable that the solvent or the least volatile component of a mixed solvent has a boiling point below 100° C. to maintain stability of the emulsion. In many cases, it may be desirable to distil under reduced pressures, particularly if the boiling point is above 100° C.

Another effective method for removing the organic solvent is by diluting the emulsion with water in amount sufficient substantially completely to dissolve the solvent out of the cellulose ether particles. Since it is desirable to maintain the effective salt or polyhydroxy compound concentration throughout the disperse phase of the particles, it is preferable to include these solutes in the elution water prior to dilution of the emulsion. The total amount of water should be in excess of the theoretical amount required for solution of the organic solvent, preferably in substantial excess.

After removal of the organic solvent, the cellulose ether particles are separated from the water, washed with water and dried. Removal of the colloid may require several washings. In general, the smaller the particles, the more water washings are required.

The cellulose ether particles prepared according to my process are substantially spherical in shape. In other words they are true spheres or closely approximate spheres, such as spheroids. The particles can be obtained in sizes as small as 1 micron or less in diameter. The particle size generally ranges up to about 10 or 30 microns. This is the preferred size range. Depending upon the specific components and concentrations employed in the process, particle size may range up to about 100 microns. In general, products in which the average particle diameter is above about 50 microns are marginal. In other words, it is preferable that the size distribution of the particles by number be such that the maximum average diameter is about 50 microns. Since all of the particles in a given production batch are obtainable in the desired small size range, there is no necessity for fractional screening or reworking of excessively large particles. Density of the cellulose ether spheres is high. Average density of my ethyl cellulose product, for example, is about 1.13–1.14 with a minimum of about 1.10 as compared with published figures of 1.07 to 1.18. The densities of the particles prepared according to my process clearly demonstrate their substantial non-porosity.

The small, substantially non-porous, substantially spherical particles of cellulose ether can be employed in the manufacture of plastic objects and materials in any desired manner. They are especially useful, however, in that they can be suspended in a plasticizer to form homogeneous, stable, fluid suspensions which may be poured as coatings or films without requiring the addition of water or a volatile solvent and may be molded into objects of any desired shape and size without the application of high temperatures and pressures.

EXAMPLE I

Ninety grams of ethyl cellulose (44.5–45.5% ethoxyl) were dissolved in 600 ml. of ethylene dichloride. The lacquer was dispersed by vigorous agitation with a dispersator in 450 ml. of water containing 12 grams of polyvinyl methyl ether-maleic anhydride as the colloiding agent, 12 grams of sodium chloride and 0.9 gram hydroquinone monomethyl ether as stabilizing agent for the ethyl cellulose. Agitation was continued and the ethylene dichloride was removed from the dispersed lacquer particles by distillation at 15–40° C. and a pressure of 6 cm. The resulting ethyl cellulose particles were 1–5 micron spheres.

EXAMPLE II

Sixty grams of ethyl cellulose (44.5–45.5% ethoxyl) were dissolved in a mixture of 340 ml. of ethyl acetate and 60 ml. of ethanol. The lacquer was dispersed by vigorous agitation with a dispersator in 300 ml. of water containing 16 grams of low viscosity casein as the colloiding agent, 12 grams sodium sulfate and 0.6 gram hydroquinone monomethyl ether as stabilizing agent for the ethyl cellulose. Agitation was continued and the ethyl acetate-ethanol was removed from the dispersed lacquer particles by distillation at 20–35° C. and a pressure of 7 cm. The resulting ethyl cellulose particles were 1–10 micron spheres.

EXAMPLE III

Twenty grams of ethyl cellulose (44.5–45.5% ethoxyl) were dissolved in 155 ml. of methyl acetate-methanol azeotrope. The lacquer was dispersed by vigorous agitation in 150 ml. of water containing 4.0 grams of sodium chloride, 2.1 grams of 4000 cps. methyl cellulose as the colloiding agent, and 1.6 grams of Turkey red oil as the emulsifying agent. Agitation was continued and the solvent was removed from the dispersed lacquer particles by distillation at atmospheric pressure. The final product consisted of 1–15 micron spheres. The density was 1.14.

EXAMPLE IV

Sixty grams of ethyl cellulose (49+% ethoxyl) were dissolved in a mixture of 380 ml. of ethylene dichloride and 20 ml. of ethanol. The resulting lacquer was dispersed by vigorous agitation with a dispersator in 300 ml. of water containing 8 grams of polyvinyl methyl ether-maleic anhydride as colloiding agent, 0.6 gram hydroquinone monomethyl ether as stabilizer, and 8 grams of sodium chloride. Agitation was continued and the solvent was removed from the dispersed lacquer particles by distillation at 15–40° C. and a pressure of 6 cm. The resulting ethyl cellulose particles were 2–40 micron spheres.

EXAMPLE V

Sixty grams of ethyl cellulose (44.5–45.5% ethoxyl) were dissolved in a mixture of 340 ml. of ethyl acetate and 60 ml. of ethanol. The resulting lacquer was dispersed by vigorous agitation with a dispersator in 300 ml. of water containing 6.0 grams of polyvinyl methyl ether-maleic anhydride as colloiding agent, 0.6 gram of hydroquinone monomethyl ether as stabilizer, and 16 grams of sodium sulfate. Agitation was continued and the ethyl acetate-ethanol solvent was removed from the dispersed lacquer particles by distillation at 20–35° C. and a pressure of 7 cm. The resulting ethyl cellulose particles were 1–20 micron spheres.

Other examples illustrating my invention are summarized in Table I. The particles were substantially spherical.

Table I

| Ethyl cellulose ethoxyl percent, grams | Solvent, ml. | Colloid, grams | Other additives | Solute, grams | Water, ml. | Size, μ |
|---|---|---|---|---|---|---|
| 49+%, 20 | Ethyl acetate, 170; ethanol 30. | Casein, 8 | | Na₂SO₄, 6 | 150 | 1-30. |
| 44.5-45.5%, 20 | do | do | | Na₂SO₄, 8 | 150 | 1-40, av. 20. |
| 49+%, 30 | do | do | | Na₂SO₄, 6 | 150 | 1-30, av. 15. |
| 47.5-49%, 20 | do | do | | NaCl, 4 | 150 | 2-20, av. 10. |
| 44.5-45.5%, 20 | do | Polyvinyl methyl ethermaleic anhydride, 6. | | NaCl, 4 | 150 | 1-2. |
| 44.5-45.5%, 20 | do | do | | NaCl, 4 | 150 | 2-10, av. 6. |
| 44.5-45.5%, 20 | do | Polyvinyl methyl ethermaleic anhydride, 3. | | NaCl, 4 | 150 | 1-8, av. 2-3. |
| 44.5-45.5%, 20 | do | Polyvinyl methyl ethermaleic anhydride, 4. | | NaCl, 4 | 150 | 1-10, av. 5. |
| 44.5-45.5%, 20 | Ethyl acetate, 160; ethanol, 40. | do | | NaCl, 4 | 150 | 1-5, av. 2-3. |
| 44.5-45.5%, 20 | Ethyl acetate, 220 | do | | NaCl, 4.4 | 165 | 1-10, av. 4. |
| 44.5-45.5%, 20 | Ethyl acetate, 187; ethanol, 33. | Polyvinyl methyl ethermaleic anhydride, 4.4. | | NaCl, 4.4 | 165 | 1-6, av. 3. |
| 44.5-45.5%, 20 | do | Polyvinyl methyl ethermaleic anhydride, 6. | | NaCl, 4 | 150 | 2-15. |
| 47.5-49%, 20 | Ethyl acetate, 170; ethanol, 30. | Polyvinyl methyl ethermaleic anhydride, 4. | | NaCl, 4 | 150 | 1-30, av. 15. |
| 49+%, 20 | do | do | Dresinate 731,[1] 2.5 g | NaCl, 4 | 150 | 1-5, av. 4. |
| 49+%, 20 | do | do | Dresinate 731,[1] 5 g | Na₂SO₄, 8 | 150 | 1-20, av. 10. |
| 49+%, 20 | do | Polyvinyl methyl ethermaleic anhydride, 3. | | Na₂SO₄, 8 | 150 | 1-20, av. 10. |
| 49+%, 30 | do | do | | NaCl, 4 | 150 | 2-40, av. 15. |
| 49+%, 30 | do | do | | NaCl, 4 | 150 | 2 layers; 1-10, av. 8; 10-50, av. 20. |
| 49+%, 30 | do | do | Dowanol 33B,[2] 1 g | NaCl, 4 | 150 | |
| 44.5-45.5%, 20 | Toluene, 160; ethanol, 40. | Polyvinyl methyl ethermaleic anhydride, 4. | | NaCl, 4 | 150 | 5-80, av. 20. |
| 49+%, 20 | Ethylene dichloride, 200. | do | | NaCl, 4 | 150 | 2-20, av. 8. |
| 49+%, 20 | do | Polyvinyl methyl ethermaleic anhydride, 2. | Marasperse C,[3] 3 g | NaCl, 4 | 150 | 2-60. |
| 49+%, 20 | do | do | Marasperse C,[3] 2 g | NaCl, 4 | 150 | 2-30, av. 15. |
| 49+%, 20 | do | do | Marasperse C,[3] 2 g. Glyceryl monoricinoleate, 0.5 g. | NaCl, 4 | 150 | 2-15, av. 10. |
| 49+%, 20 | Ethylene dichloride, 170; ethanol, 30. | do | do | NaCl, 4 | 150 | 2-10, av. 5. |
| 49+%, 30 | Ethylene dichloride, 90; ethanol, 10. | do | Marasperse C, 2 g | NaCl, 4 | 150 | 2-40, av. 20. |

[1] Alkali metal rosin salt.
[2] 1 methoxy 2 propanol.
[3] Lignin sulphonic compound.

Although this invention has been described with reference to illustrative embodiments thereof, it will be apparent to those skilled in the art that it may be embodied in other forms but within the scope of the appended claims.

I claim:

1. Water-insoluble cellulose ether selected from the group consisting of alkyl cellulose and hydroxyalkyl cellulose, in the form of solid, substantially spherical, substantially non-porous particles having a maximum diameter of about 100 microns, said particles being characterized by their ability to be dispersed in a plasticizer to form fluid suspensions.

2. Water-insoluble cellulose ether selected from the group consisting of alkyl cellulose and hydroxyalkyl cellulose, in the form of solid, substantially spherical, substantially non-porous particles having a maximum average diameter of about 50 microns and a maximum diameter of about 100 microns, said particles being characterized by their ability to be dispersed in a plasticizer to form fluid suspensions.

3. Water-insoluble cellulose ether selected from the group consisting of alkyl cellulose and hydroxyalkyl cellulose, in the form of solid, substantially spherical, substantially non-porous particles having a maximum diameter of about 30 microns, said particles being characterized by their ability to be dispersed in a plasticizer to form fluid suspensions.

4. The product of claim 1 in which the cellulose ether is alkyl cellulose.

5. The product of claim 2 in which the cellulose ether is alkyl cellulose.

6. The product of claim 3 in which the cellulose ether is alkyl cellulose.

7. The product of claim 4 in which the alkyl cellulose is ethyl cellulose.

8. The product of claim 5 in which the alkyl cellulose is ethyl cellulose.

9. The product of claim 6 in which the alkyl cellulose is ethyl cellulose.

10. The product of claim 7 in which the ethyl cellulose has a minimum density of about 1.1.

11. The product of claim 8 in which the ethyl cellulose has a minimum density of about 1.1.

12. The product of claim 9 in which the ethyl cellulose has a minimum density of about 1.1.

13. The product of claim 5 in which the alkyl cellulose is lower-alkyl.

14. The product of claim 6 in which the alkyl cellulose is lower-alkyl.

References Cited in the file of this patent

UNITED STATES PATENTS

| | | |
|---|---|---|
| 2,095,524 | Lilienfeld | Oct. 12, 1937 |
| 2,176,678 | Neuroth | Oct. 17, 1939 |
| 2,238,714 | Wells | Apr. 15, 1941 |
| 2,331,865 | Swinehart et al. | Oct. 12, 1943 |
| 2,618,018 | Downing et al. | Nov. 18, 1952 |
| 2,631,943 | Matter | Mar. 17, 1953 |
| 2,636,879 | Branan et al. | Apr. 28, 1953 |
| 2,722,528 | Johnson | Nov. 1, 1955 |
| 2,740,723 | Voris | Apr. 3, 1956 |